United States Patent Office 3,418,949
Patented Dec. 31, 1968

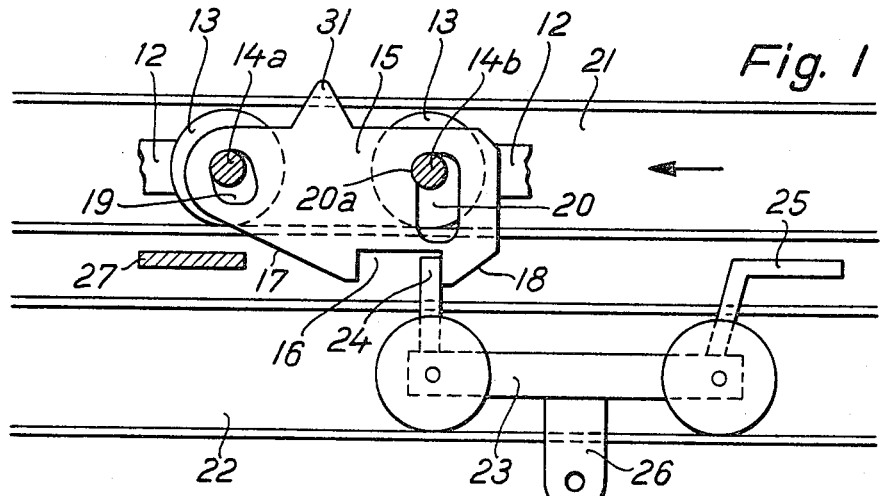
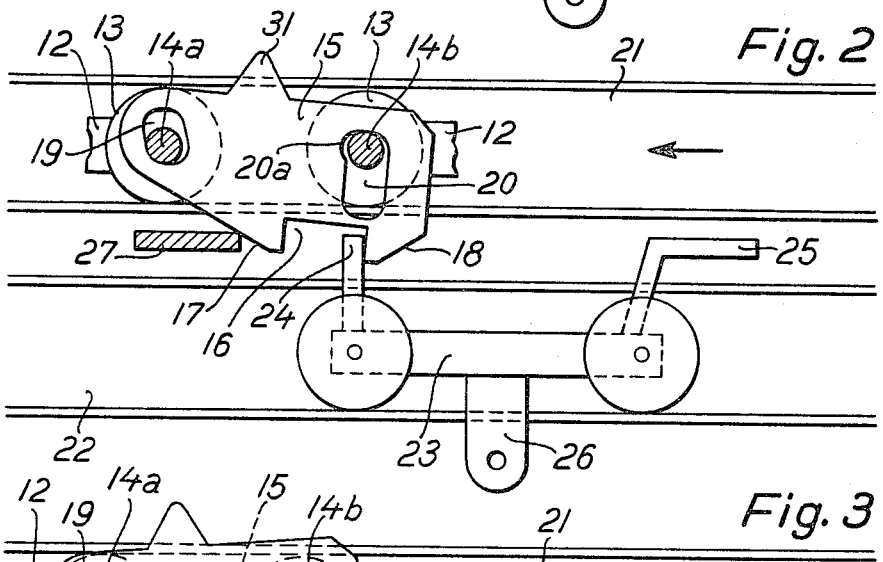
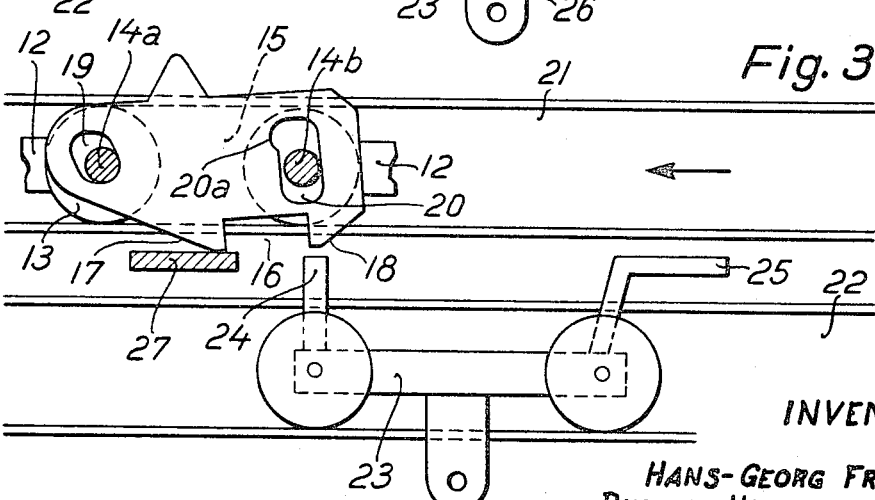

3,418,949
CHAIN DRIVEN CONVEYOR SYSTEM HAVING DRIVING MEMBERS
Hans-Georg Fromme, Wetzlar, Rudolf-Heinrich Reitz, Oberquembach, and Willi Huppke, Braunfels, Germany, assignors to Fromme Forderanlagen G.m.b.H., Wetzlar, Germany
Filed Mar. 13, 1967, Ser. No. 622,712
Claims priority, application Germany, Aug. 16, 1966, F 49,946
1 Claim. (Cl. 104—172)

ABSTRACT OF THE DISCLOSURE

A conveyor system adapted to transport goods in or on holders from one place to another. The holders are movable along a fixed trackway under the propulsion of a driving chain running along guide means above and in parallel to said trackway. The chain is provided with rollers journaled on the link pins between the chain links. Driving members are rested on two adjacent link pins by means of two oblong holes. Both holes extend in a direction perpendicular to the direction of chain travel, i.e., in a vertical direction. The front edge of the front oblong hole is inclined to that vertical direction with the lower end of the edge spaced away from the vertical line in the direction opposite to the direction of chain travel. The holes are sufficiently wide to allow for a lateral as well as for pivotal motions of the driving member relative to the link pins. A recess is provided in the front edge of the rear oblong hole for the rear link pin to rest in during conventional chain travel.

BACKGROUND OF THE INVENTION

Field of the invention

This invention relates to conveyor systems of the type in which the goods to be transported are placed in or on holders. Said holders are guided along a fixed trackway and are propelled by a driving roller type chain running in guide means above and in vertical alignment with the trackway.

Description of the prior art

It is well known to provide the driving chains of the above mentioned type of conveyor systems with driving members, such as pawls. The pawls are placed between the two side portions of one chain link and are pivotable about the link pin. A portion of the pawl is formed into a catch and is adapted to interengage the holder and impart a positive drive thereto.

The catch, however, is subject to considerable wear which results in its edges being rounded. If the pivot of the pawl in the direction of the chain travel is located in front of the pawl itself, i.e., if the holders are pulled rather than pushed, the catch will then easily become disengaged from the holder, thus causing the holder to be unintentionally released from the driving chain between two stations. This will particularly occur if the chain during its travel tends to flutter owing to small obstacles in the path of the chain rollers or merely to a rugged surface of the roller guide.

Summary of the invention

The conveyor system according to our invention avoids these disadvantages. It is the object of our invention to provide driving members adapted to secure a ready release of the holders from the driving member at the release stations. The driving members at the same time are designed to give greatest possible protection against any unintentional release between two stations during the transport of the goods. In a preferred embodiment of our invention both holes of each driving member extend perpendicular to the direction of chain travel. The front edge of the front oblong hole, however, being slightly inclined to that perpendicular direction with the lower end of the edge being spaced away from the perpendicular, i.e., the vertical line in the direction opposite to the direction of chain travel.

The rear hole is longer than the front hole and is sufficiently wide to allow for a pivotal motion of the driving member about the front link pin. A recess is provided in the upper end of the front edge of the rear oblong hole, said recess extending in the direction of chain travel. Both oblong holes are spaced from each other for the driving member to rest with the upper end of the front oblong hole on the front link pin and with the recess of the rear oblong hole on the rear link pin. The arrangement being such that the link pins act consecutively as pivots of the driving member, thus causing the driving member first to pivot about the rear link pin and thereafter to pivot about the front link pin.

During conventional chain travel the recess in the rear oblong hole acts as a detent for the driving member, thus preventing any unintentional release of the holders between the station. It is only upon abutment of the driving member against the stationary stop member that the driving member with its recess comes free from the rear link pin allowing the driving member to release the holder, as will hereinafter be described in more detail.

Description of the drawings

A preferred embodiment of the invention is illustrated by way of example in the accompanying drawings in which:

FIG. 1 shows a preferred embodiment of the driving member in engagement with a holder during conventional transportation, FIG. 2 shows the driving member in a first pivotal motion upon abutment against a stationary stop member, FIG. 3 shows that the driving member in a second pivotal motion upon abutment against a stationary stop member.

Description of the preferred embodiment

The driving chain illustrated in the drawings consists of the chain links 12 which are interconnected by the link pins 14a and 14b. The link pins also serve as the shafts on which the rollers 13 are journaled. A guideway 21 is provided for the chain rollers 13, said guideway being positioned above and parallel to the trackway 22, the latter being adapted to guide the holders 23 in or on which the goods are transported. The holders are engaged by driving members 15 which are carried by the driving roller chain.

The driving member 15 as illustrated in the FIG. 1–3 is provided with two oblong holes 19 and 20. With the front hole 19 the driving member rests on the front link pin 14a and with the rear hole 20 it rests on the rear pin 14b. The link pins 14a and 14b connect the links 12.

The front hole 19 is sufficiently long and wide to allow for a limited lateral and vertical motion of the driving member 15 about the front pin 14a. In a like manner the rear hole 20 is designed to allow for the same lateral motion. The hole 20 is, however, shaped considerably longer than the front hole 19, thus allowing for a vertical motion large enough to decouple the holder 23 from the driving member 15 as will be readily understood when hereinafter explained by reference to the FIGS. 2 and 3.

At its upper end the rear hole 20 is provided with a recess 20a in the direction of the chain travel. During conventional transport the rear link pin 14b rests in this recess, the edge of the recess at the same time being the edge of impact of the propelling force. Recess 20a acts as a detent, preventing the driving member 15 from being vertically displaced which would result in an unintentional release of the holder 23.

The lower portion of the driving member 15 is shaped to form two oblique edges 17 and 18. The edge 17 being adapted to engage the stop member 27 which is rigidly positioned at the station. Both edges 17 and 18 subtend the catch 16 which is in abutting connection with portion 24 of the holder 23.

Whereas FIG. 1 illustrates the conditions of adjustment during conventional transportation, FIG. 2 shows the action of the driving member 15 upon abutting with its edge 17 against the stop member 27, the latter being located at a release station.

The driving member 15 is caused to pivot about the rear pin 14b in a clockwise direction until the lower edge of hole 19 abuts against the front pin 14a. Owing to the slight inclination of the front edge of hole 19 the driving member 15 at the same time is displaced relative to both link pins 14a, 14b in the direction of chain travel as indicated by the arrows in FIGS. 1, 2 and 3, and as a consequence thereof the driving member 15 rests now with the middle portion of its upper edge of rear hole 20 on pin 14b. The latter is thus free from the recess 20a.

At the precise moment the lower edge of front hole 19 abuts against pin 14a the driving member 15 is stopped in its clockwise rotary motion and is thrown into an counterclockwise pivotal motion, this time about the front pin 14a, as illustrated by FIG. 3. The lower portion of the driving member 15—particularly the catch 16—will be lifted sufficiently high to become decoupled from the portion 24 which results in a release of holder 23.

It is to be understood that the action of releasing holder 23 includes two different pivotal motions on the part of the driving member 15. One first pivotal motion in a clockwise direction about pin 14b (FIG. 2) which is immediately followed by a pivotal motion in an counterclockwise direction about the front pin 14a (FIG. 3).

The latter motion lifts the lower portion of driving member 15 sufficiently high to slide across stop member 27 as well as to pass over portion 24 which thereupon abuts against stop member 27 itself. The holder 23 is thus brought to a halt in front of stop member 27. An extra stop member 25 is provided at the rear end of holder 23 which serves as stop member for the driving member next in line to abut against.

It will be understood that this invention is susceptible to modification in order to adapt it to different uses and conditions and accordingly it is intended to include in this invention all modifications which come within the scope of the following claim.

What we claim is:

1. A conveyor system for transporting goods by means of holders (23) movable along a trackway (22), said conveyor system comprising a guideway (21) positioned above and parallel to the trackway (22), a driving chain (12) carrying rollers (13) for travelling in the guideway (21), said chain comprising links connected by front and rear pivot pins (14a) and (14b) respectively on which the rollers are mounted, a flat driving member (15) whose lower edge is equipped with a catch (16) adapted to engage a holder (23) and with an inclined edge (17) in front of the catch to tilt the driving member upwardly to disengage the catch from the holder (23) when the inclined edge encounters a stop member (27), said driving member having front and rear holes (19) and (20) in which the pivot pins (14a) and (14b) are positioned respectively, the front hole (19) being slightly elongated in the vertical direction while the rear hole (20) is greatly elongated in the vertical direction, the upper end of the elongated rear hole being slightly widened in the forward direction at (20a).

References Cited

UNITED STATES PATENTS 3,242,874    3/1966    Orwin _____ 104—178

FOREIGN PATENTS 680,946    2/1964    Canada.

ARTHUR L. LA POINT, *Primary Examiner.*

D. F. WORTH, *Assistant Examiner.*

U.S. Cl. X.R.

104—178